(12) United States Patent
Strong et al.

(10) Patent No.: US 8,683,903 B2
(45) Date of Patent: Apr. 1, 2014

(54) COMPLIANT HOLD-DOWN CONVEYOR FOR SLICER

(75) Inventors: John R. Strong, Bellevue, WA (US); Norman A. Rudy, Burlington, WA (US); Nicholas C. Tipper, Lake Forest Park, WA (US)

(73) Assignee: John Bean Technologies Corporation, Chicago, IL (US)

( * ) Notice: Subject to any disclaimer, the term of this patent is extended or adjusted under 35 U.S.C. 154(b) by 504 days.

(21) Appl. No.: 12/186,445

(22) Filed: Aug. 5, 2008

(65) Prior Publication Data
US 2009/0038455 A1 Feb. 12, 2009

Related U.S. Application Data

(60) Provisional application No. 60/954,281, filed on Aug. 6, 2007.

(51) Int. Cl.
*B26D 7/06* (2006.01)
(52) U.S. Cl.
USPC .......... 83/422; 83/425; 198/626.4; 198/626.6
(58) Field of Classification Search
USPC .............. 198/626.1–626.6; 83/19, 76.6–76.9, 83/150, 155, 155.1, 161, 162, 165, 404, 83/409, 409.1, 409.2, 412, 422, 425, 435, 83/435.2, 437.7, 444, 447, 448, 450, 83/466.1, 809, 813, 932, 427, 431
See application file for complete search history.

(56) References Cited

U.S. PATENT DOCUMENTS

| | | | | |
|---|---|---|---|---|
| 1,825,205 A | * | 9/1931 | Reynoldson | 83/422 |
| 1,987,231 A | * | 1/1935 | Engel | 134/127 |
| 2,619,306 A | | 11/1952 | Lake | |
| 2,634,768 A | * | 4/1953 | Hight | 83/415 |
| 3,468,409 A | * | 9/1969 | Ball | 198/626.6 |
| 3,722,343 A | * | 3/1973 | Cornell | 83/422 |
| 3,880,274 A | * | 4/1975 | Bechtloff et al. | 198/626.2 |
| 3,969,967 A | * | 7/1976 | Isley | 83/435.2 |

(Continued)

FOREIGN PATENT DOCUMENTS

DE 1195669 B1 6/1965
EP 1153714 A1 11/2001
(Continued)

OTHER PUBLICATIONS

Communication Pursuant to Article 94(3) EPC mailed Jul. 28, 2010, issued in corresponding European Application No. EP 08 826 939.4, filed Aug. 5, 2008, 3 pages.

*Primary Examiner* — Omar Flores Sanchez
(74) *Attorney, Agent, or Firm* — Christensen O'Connor Johnson Kindness PLLC

(57) ABSTRACT

The powered endless belt (14) of a lower conveyor (12) transports workpieces (16) past a scanning station (18) and then past a slicing station (20), whereat the workpieces are sliced into desired thickness by a powered blade (23). An upper hold-down conveyor (24) includes a powered belt (26) that assists in holding the workpieces stationary and stable as workpieces travel past the slicing station (20). In this regard, the belt is of a compliant construction and is operated at a low enough tension to enable it to substantially conform to the contour of the upper surface of the workpiece, thereby to apply a substantially uniform load about the entire upper surface area of the workpiece.

25 Claims, 12 Drawing Sheets

(56) References Cited

U.S. PATENT DOCUMENTS

| | | | |
|---|---|---|---|
| 5,271,304 A * | 12/1993 | Wygal et al. | 83/422 |
| 5,320,017 A * | 6/1994 | Lecrone | 83/871 |
| 5,364,301 A * | 11/1994 | Kestner et al. | 452/18 |
| 5,415,274 A | 5/1995 | Krismanth | |
| 5,875,697 A * | 3/1999 | Cole et al. | 83/435.2 |
| 6,173,638 B1 * | 1/2001 | Denney | 83/874 |
| 6,383,068 B1 * | 5/2002 | Tollett et al. | 452/170 |
| 6,563,904 B2 | 5/2003 | Wijts | |
| 6,763,748 B2 * | 7/2004 | Wolcott et al. | 83/29 |
| 6,854,590 B2 * | 2/2005 | Rudy et al. | 198/690.2 |
| 6,955,256 B2 * | 10/2005 | Tsoukalas et al. | 198/626.5 |
| 7,096,769 B2 * | 8/2006 | Biggs et al. | 83/435.2 |
| 7,524,241 B2 * | 4/2009 | Markert | 452/149 |
| 7,592,029 B1 * | 9/2009 | Linck et al. | 426/518 |
| 2003/0037649 A1 * | 2/2003 | Zelinski et al. | 83/53 |
| 2004/0007110 A1 * | 1/2004 | Long et al. | 83/435 |
| 2004/0134319 A1 * | 7/2004 | Sandberg | 83/13 |

FOREIGN PATENT DOCUMENTS

| | | |
|---|---|---|
| GB | 591080 | 8/1947 |
| JP | 63-78013 A | 4/1988 |
| WO | 9109531 A1 | 7/1991 |
| WO | 9307999 A1 | 4/1993 |

* cited by examiner

COMPLIANT HOLD-DOWN CONVEYOR FOR SLICER

CROSS-REFERENCE TO RELATED APPLICATION

This application claims the benefit of Provisional Application No. 60/954,281, filed Aug. 6, 2007.

TECHNICAL FIELD

The present invention pertains to supporting a workpiece in stable condition for analysis and/or processing and, more particularly, for presenting workpieces, such as food products, on a moving conveyor system for analysis and/or slicing or other processing of the workpiece in a stable manner so that the analysis of the workpiece can be carried out accurately and slicing or other processing of the workpiece can also be carried out with precision and, thereafter, automatically transporting the sliced workpiece portions for further analysis, sorting and/or processing.

BACKGROUND

Work products, including food products, are sliced or otherwise portioned by processes in accordance with customer needs as well as to remove waste or undesirable sections of the work product/food products. For example, the top slice of pork or beef butt is removed by slicing and discarded. As another example, chicken breasts are sliced in accordance with customer specifications to produce items such as chicken breast sandwiches, chicken breast strips, etc. Often the breast meat is too thick to be appropriate for the end use and thus is sliced to reduced thickness. It is important that the slicing be carried out accurately to meet product specifications for cooking, etc. In some cases, it is necessary to slice each individual piece of meat to a different thickness for simultaneously producing multiple end products or to achieve a specified total weight for one piece. To achieve this goal, precision in slicing is essential.

The foregoing cutting/slicing operations could be carried out by hand, but at this point in time, such operations are more commonly performed with processing equipment. For example, commonly the food product will be carried along the belt of a lower conveyor mounted on a supporting frame. A second, upper conveyor is positioned so that its belt extends generally parallel to and spaced from the lower conveyor belt. The upper conveyor cooperates with the lower conveyor to transport the food product past a slicing device, such as an oscillating knife, rotary saw or band saw, positioned between the upper and lower conveyor belts. A top slice separator plate can be mounted downstream of the slicing device, between the upper and lower conveyor belts, in an effort to separate the top slice from the bottom slice rather than having to manually remove the top slice from the bottom slice.

A drawback of the foregoing apparatus is that the rigid or substantially rigid upper and lower conveyor belts used to "pull" the food product past the band saw or oscillating knife deforms the food product while it is being cut. As a result, the final resulting thickness is different for each piece of sliced meat after it is allowed to relax again. The thicker pieces are deformed more than thinner pieces when squeezed into the same dimension between the upper and lower conveyor belts, resulting in variability in the deformation; thus the accuracy of slicing to specific thicknesses is imprecise.

Also using existing technology, it is necessary to adjust the spacing between the upper and lower conveyors to accommodate different types of food products being sliced or to accommodate food products form a different source that is of a different average thickness from the food product last processed. Although it may be critical to make this adjustment in conveyor spacing, not infrequently such adjustment is forgotten or missed by production workers, which can cause not only damage to the food product and equipment, but also significant variation in the finished thickness of the food product.

Also, prior to processing of the food product, various techniques are used to analyze the food product to ascertain its size, shape, weight, contour, and other physical attributes. This analysis is commonly carried out by using scanning techniques. Thereafter, the scanning data is analyzed by a computer operating under scanning software to determine the physical characteristics of the food product and also how to slice or otherwise portion the food product to achieve desired end products. However, not infrequently the food product, perhaps due to being still partially frozen or for other reasons, does not "sit flat" on the conveyor belt as it passes the scanning station. It would be advantageous to "flatten" or otherwise cause the workpiece to assume its "natural" configuration during the scanning process.

The present invention seeks to address the above-noted and other shortcomings of existing equipment available for analyzing and processing work products, including food products.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An apparatus for processing a work product includes a work station for analyzing and/or acting on the work product. The work product is carried to the work station by first powered transport and support surface. In addition, a compliant hold-down conveyor cooperates with the support and transport surface to transport the work product to the work station, and optionally beyond the work station. The compliant hold-down conveyor includes a compliant conveyor belt located above the support and transport surface to overlie a work product. The belt is sufficiently compliant and operated under a low enough tension that it nominally conforms to the contour of the upper surface of the work product, thereby applying a substantially uniform load on such upper surface.

In accordance with a further aspect of the present invention, the work station may be scanning station, a portioning station, a sorting station, or other type of work station.

In accordance with another aspect of the present invention, the work station slices the work product into a first section adjacent to a compliant hold-down conveyor and a second section adjacent the support and transport surface. Further, a separator tray is positioned between the support and transport surface and the compliant hold-down conveyor belt to support the cut first portion of the work product for movement along the separator tray in the downstream direction, with the movement of such cut portion being under the influence of the compliant hold-down conveyor.

In an additional aspect of the present invention, the elevation of the support and transport surface is adjustable in the direction toward and away from the compliant hold-down conveyor.

In accordance with a further aspect of the present invention, the compliant hold-down conveyor is located above the support and transport surface. In addition, a support device is provided to support the compliant hold-down conveyor belt at a minimum elevation above the work station.

In an additional aspect of the present invention, a load is imposed on the compliant hold-down conveyor at a location adjacent the work station. Such load in turn is applyable to the work product via the compliant hold-down conveyor.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
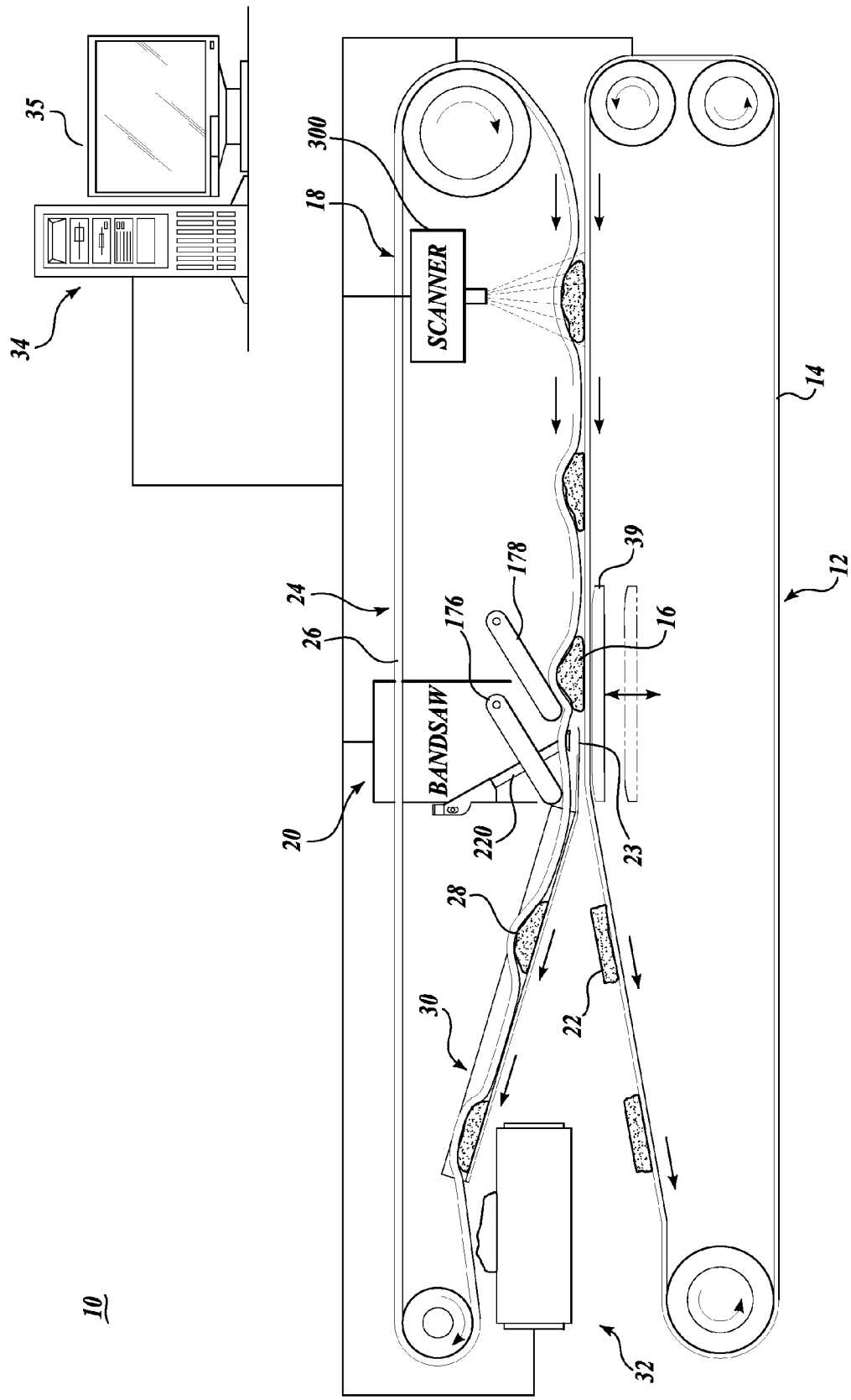
FIG. 1 is an elevational view in schematic of one embodiment of the present disclosure.

FIG. 1 schematically illustrates a system 10 suitable for implementing an embodiment of the present disclosure. The system 10 includes a lower conveyor 12 employing an endless powered belt 14 to support and transport work products or workpieces 16 past a first workstation 18 in the form of a scanning station, and then past a second workstation 20 shown in the form of a slicing station, with the lower portions 22 of the workpiece sliced by blade 23, transported on for further processing, packaging, etc. Although a single powered support and transport conveyor 12 is illustrated, system 10 may utilize more than one such conveyor, for example, a loading conveyor, a processing conveyor, and an unloading conveyor.

System 10 also includes an upper hold-down conveyor 24 utilizing a powered belt 26 that assists in holding the workpieces 16 in stable and stationary condition as they travel past the scanning station 18 as well as past the slicing station 20, and then provides a motive force for sliding the sliced upper trim portions 28 of the workpiece onto a separator plate in the form of a trim tray 30 and then deposit the upper trim portion onto a transverse take-away conveyor 32. The belt 26 is of a compliant construction and is operated in sufficiently slack condition that the belt conforms to the contour of the upper surface of the workpieces, thereby to apply a substantially uniform load along the entire upper surface of the workpieces. The hold-down conveyor 24 is illustrated as a singular unit. However, system 10 may utilize more than one hold-down conveyor, for example, a hold-down conveyor may be employed upstream from the scanning station 18, and then a second hold-down conveyor used in conjunction with the slicing station 20 and trim tray 30.

The conveyors 12 and 24, as well as the scanning workstation 18 and slicing workstation 20, are coupled to and controlled by a processor or computer 34. The processor/computer 34 includes a monitor 35 as well as an input device, not shown, such as a keyboard and/or a mouse. Rather than utilizing computer 34, system 10 might be connected to a network computer system that controls other equipment and other aspects of the processing plant at which system 10 is located.

The upper run of conveyor belt 14 can be supported by underlying rollers or support structures. As shown schematically in FIG. 1, at the location of slicing station 18 the underside of belt 14 can be supported by a vertically adjustable support section 39. The support section 39 is adjustable in elevation, thereby to alter the thickness of the sliced lower portion 22, as discussed more fully below. The elevation of support section 39 can be adjusted by numerous methods known in the art. For example, the support section 39 can be mounted on a parallel arm system, with the arms raised and lowered by fluid or electrical actuators, screw jacks, rack and pinion devices, etc. As an alternative, the support section 39 can be mounted on a set of vertical slides and an actuator used to raise and lower the support section 39 along the slides.

FIGS. 2, 3, 4A and 4B illustrate a system 36 suitable for implementing another embodiment of the present disclosure. The system 36 is similar to the system 10, but without a scanning station. However, system 36 does include several downstream sorting stations 38A, 38B, 38C, and 38D to sort and optionally redirect the sliced lower portions 22, as described more hilly below. In system 36, a scanning station may be utilized that is separate from slicing station 20. The components of system 36 that correspond to system 10 are represented by the same part numbers.

Figure 2:
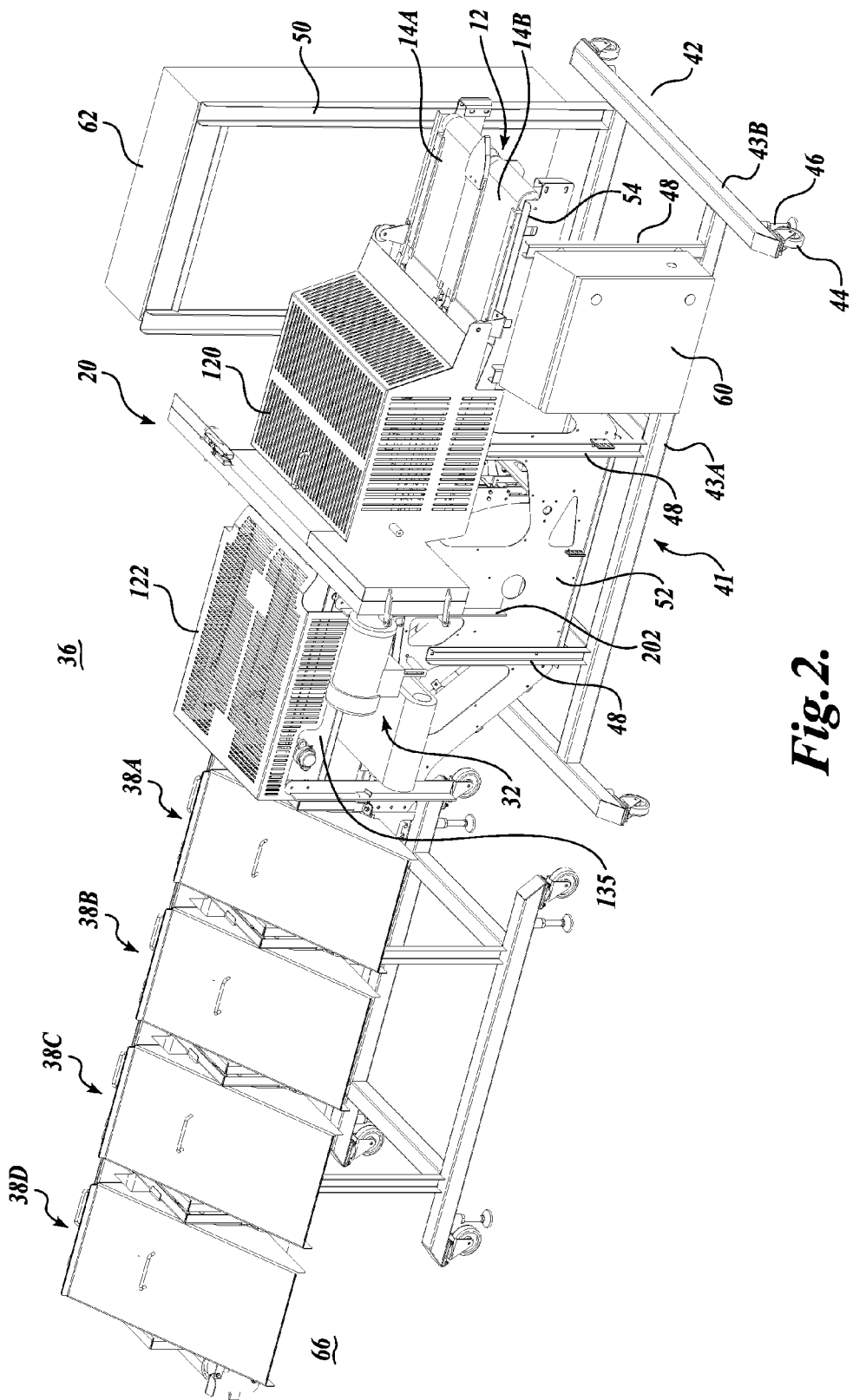
FIG. 2 is an isometric view of a second embodiment of the present disclosure.

As illustrated in FIGS. 2, 3, 4A and 4B, system 36 is mounted on a frame 41 having a base structure 42 composed of spaced apart longitudinal tubular members 43A that intersect transverse tubular end members 43B. Rollers 44 are mounted to the underside of the distal end portions of the end members 43B to enable the system 36 to be conveniently moved about as needed. A foot structure 46 also depends downwardly from the underside of the frame transverse end members 43B at locations adjacent to rollers 44 to support the base 42 off of the floor in stationary position. The foot structures 46 are adjustable in length in this regard. A series of upright post members 48 and 50 extend upwardly from the base longitudinal members 43A to support contoured side panels 52 that form the side structures of the frame 41. Flanges 54 extend outwardly from the upper edge portion of the side panels 52 to provide rigidity thereto. Although the post members 50 are illustrated as composed of channel-shaped members, they can be of other shapes such as tubular. As shown in FIG. 2, a smaller control box 60 is mounted on post 48, and a larger control box 62 is mounted on the opposite side of the frame 41 on taller post members 50. These boxes contain the components used to control the operation of system 36, including the conveyors 12 and 24, as well as the slicing station 20 and sorter stations 36. In this manner system 36 is substantially self-contained.

Figure 3:
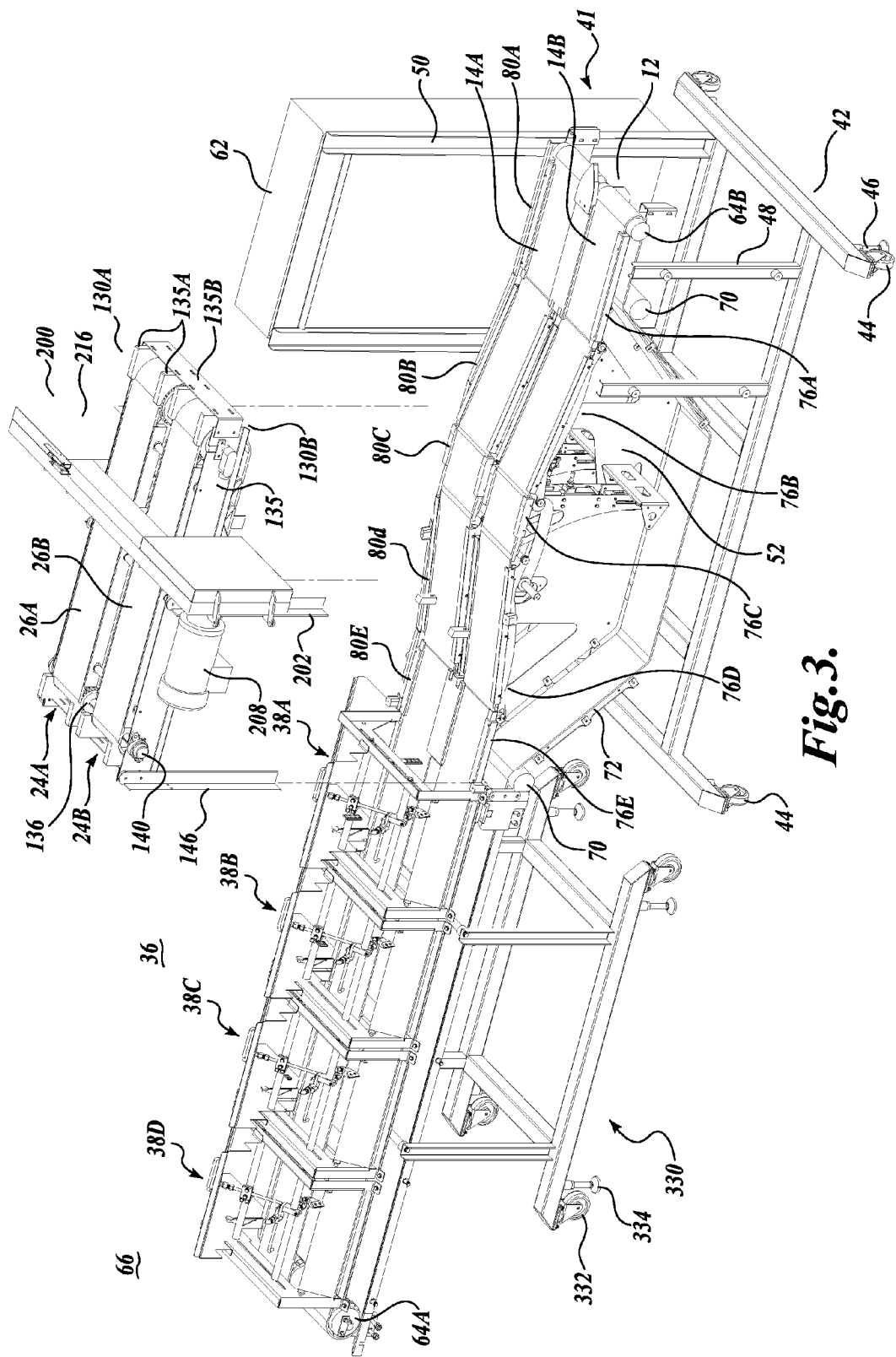
FIG. 3 is a view similar to FIG. 2 but with covers and other components removed and with portions of the system broken away so as to provide a better view of the interior of the system.
Figure 4A:
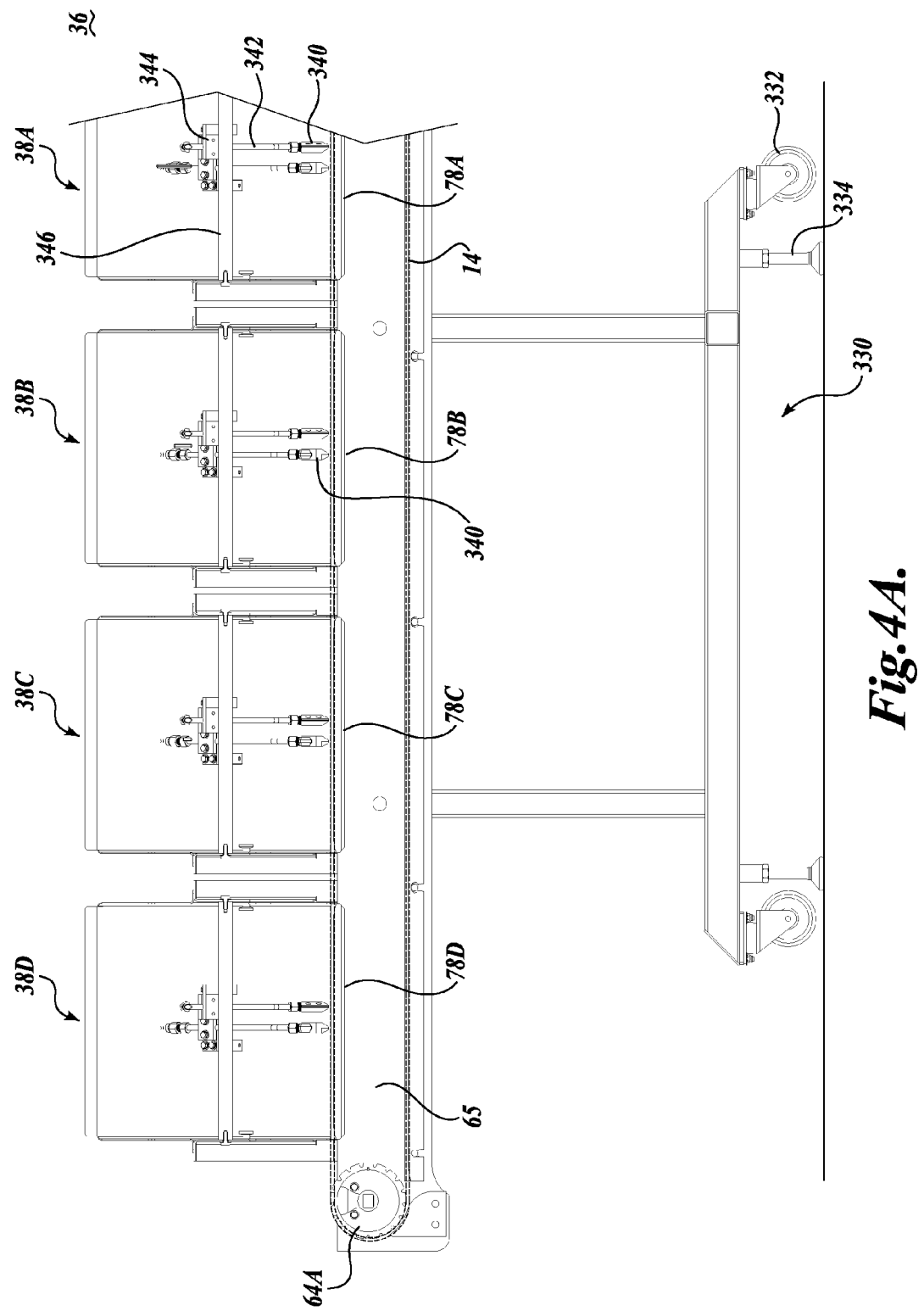
FIG. 4A is a side elevational view of the sorting station of the system of FIGS. 2 and 3.
Figure 4B:
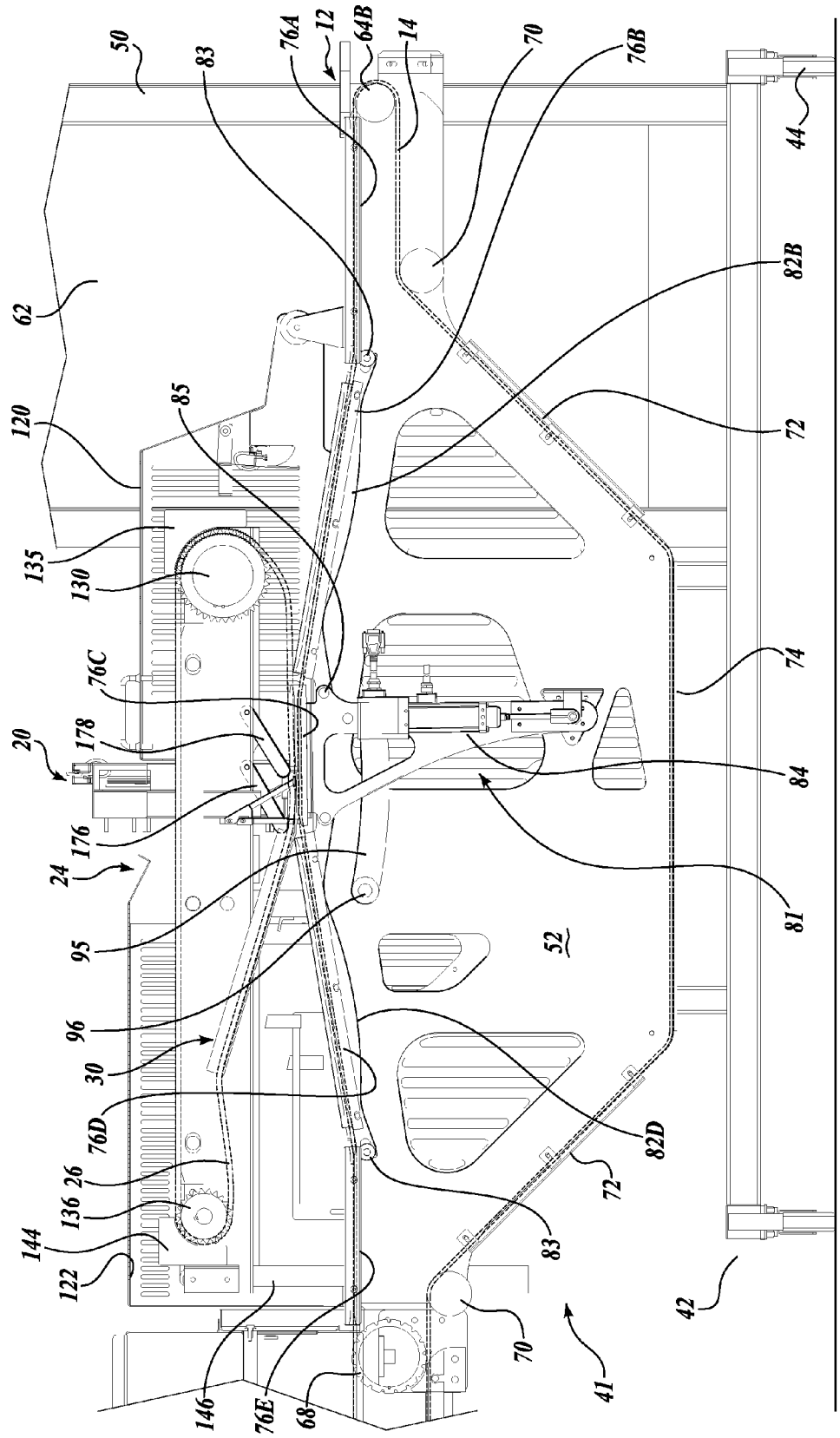
FIG. 4B is a side elevational view of the portion of the sorting system of FIGS. 2 and 3 shown to the right side of FIG. 4A.

Still referring to FIGS. 2, 3, 4A and 4B, lower conveyor 12 is constructed with two side-by-side lanes, each having separate support and transfer conveyor belts 14A and 14B. The belts span both the slicing station and the sorting/discharge stations and are trained over end rollers 64A and 64B, located at the far distal end of the sorting stations 38A-38D and at the proximal inlet end of the slicing station 20, respectively. The end rollers 64A are rotatably mounted on a support shaft that spans between the side members 65 of the conveyor 12 located at discharge station 66. End rollers 64A serve as drive rollers to drive the belts 14A and 14B in a standard manner. End rollers 64B are similarly mounted on support shafts spanning between the side panels 52 of frame 41. One or more intermediate rollers 68 may be positioned intermediate the end rollers 64A and 64B as shown in FIG. 4B. Also, idler rollers 70 may be used to direct the conveyor belts along the desired path which, as shown in FIGS. 3 and 4B, extends generally along the perimeter of frame side panels 52 and conveyor side members 65. Elongate panels 72 are used to guide the belts 14A and 14B along the lower diagonal edges of the frame side panels 52. Likewise, a bottom panel 74 guides the belts 14A and 14B running along the bottom section of side panels 52.

The upper runs of belts 14A and 14B are supported by a series of platform sections 76A, 76B, 76C, 76D, and 76E from the inlet end of the conveyor 12 to the sorting station 38A-38D. These platform sections are positioned along the upper edge portion of frame side panels 52 and span between the frame side panels, see FIG. 4B. The platform section 76B slopes slightly upwardly from the adjacent end of platform section 76A to terminate adjacent the substantially horizontal center platform section 76C. Correspondingly, platform section 76D slopes downwardly from center platform section 76C to the adjacent end of platform section 76E, which is shown as substantially horizontal. The section of the belt upper run extending along the sorting stations 38A-38D is also supported by a series of platform sections 78A, 78B, 78C, and 78D, each associated with a particular sorting station 38A, 38B, 38C, and 38D. The conveyor belts 14A and 14B are restrained and guided by belt guides 80A, 80B, 80C, 80D, and 80E, which are mounted on the platform sections 76A, 76B, 76C, 76D, and 76E, respectively, to restrain and guide belts 14A and 14B for travel along the platform sections. Further guides, not shown, help to guide the belts 14A and 14B along the sorting stations 38A-38D in a standard manner. Each of the belt guides 80A-80E includes a side section that restrains the corresponding edges of the belts 14A and 14B as well as the top section that slightly overlaps the side top edges of the belts 14A and 14B.

Belt platform sections 76A and 76E are attached to the frame side panels in a stationary manner. However, platform sections 76B, 76C and 76D are hinged together to enable these sections to raise and lower relative to the elevation of slicing station 20 by operation of an elevation assembly 81, see especially FIGS. 4 and 10. Platform sections 76B and 76D span between pivot arms 82B and 82D having their opposed lower end portions pivotally mounted to frame side panel 52 by a pivot rod 83 extending through slots formed in the corresponding ends of pivot arms 82B and 82D, and then through close-fitting openings formed in the side panels 52. The opposite ends of the pivot arms 82B and 82D, adjacent platform center section 76C, are pivotally mounted to the upper ends of vertically elongated lift plates 84 by cross rods 85 that extend through close-fitting openings formed in the upper end portions of the lift plates 84, and then through close-fitting openings formed in the adjacent ends of the pivot arms 82B and 82D. The center platform section 76C is mounted to a cross plate 86 spanning the upper edges of lift plates 84, see FIG. 10. The cross plate 86 may be integrally constructed with the lift plates 84 so as to form a singular, generally U-shaped structure.

Figure 10:
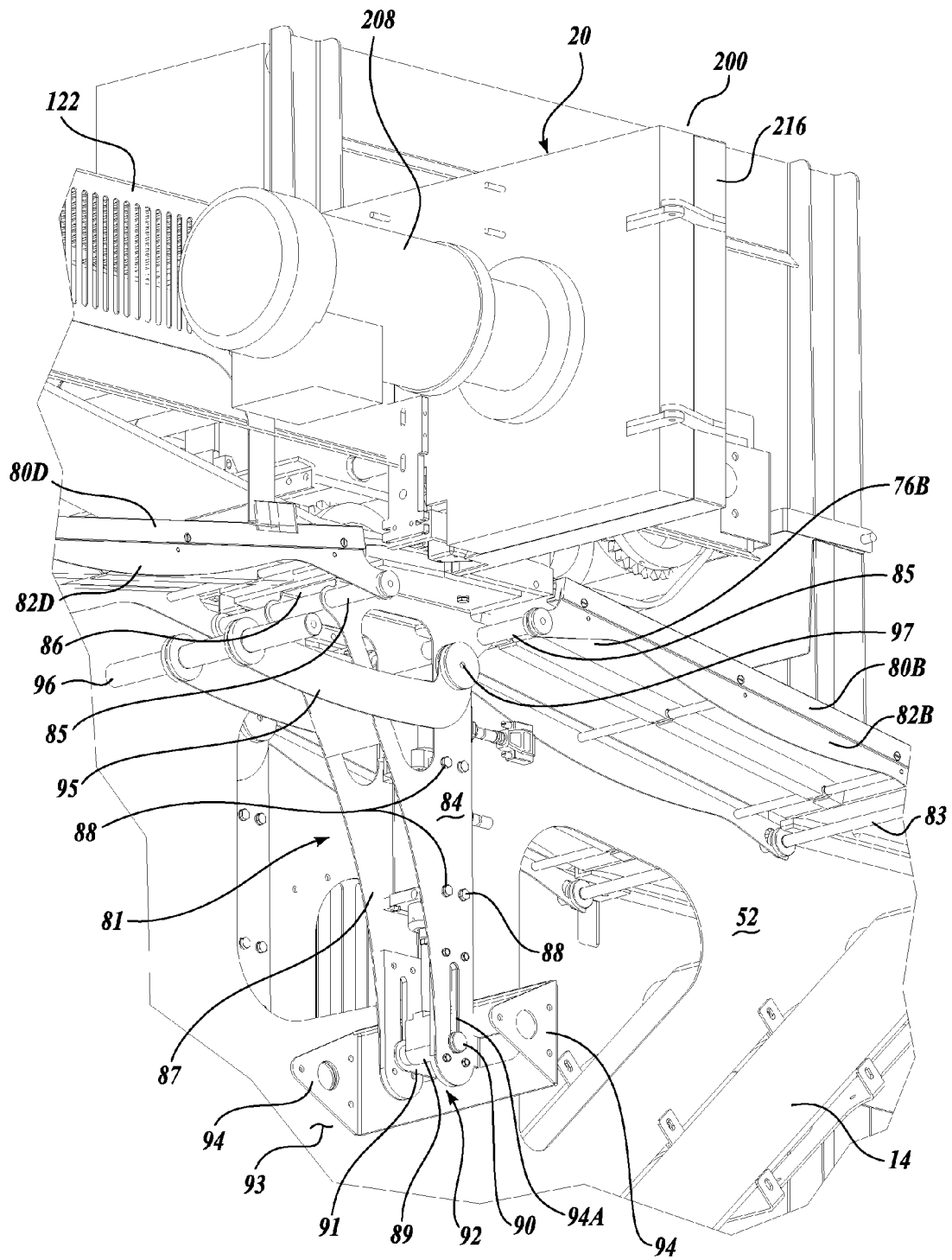
FIG. 10 is an enlarged fragmentary cross-sectional view focusing on one system for raising and lowering the transport and support conveyor at the slicing station.

As shown in FIG. 10, the belt guides 80B and 80D are attached to corresponding pivot arms 82B and 82D. In this regard, the belt guides are formed with an upper flange portion extending longitudinally of the guide and inwardly relative to the longitudinal center line of belts 14A and 14B, thereby to overlap the side edge portions of the belts. In addition, belt guides 80B and 80D are formed with a thin slot in the underside thereof, extending along the length of the guide to engage over the upper edge of corresponding pivot arms 82B and 82D. The belt guides 80B and 80D may be held in place relative to the pivot arms by any convenient means, such as by hardware members.

The lift plates 84 are vertically supported and vertically movable through the use of a linear actuator 87, having an upward body portion disposed between the inside faces of the lift plates 84 and attached to the lift plates by transverse hardware members 88 or other means. The distal, lower rod end of the linear actuator 87 is attached to a connecting head 89, which in turn is pivotally coupled to a cross pin 90. The cross pin 90 engages through close-fitting openings formed in inward attachment ears 91, projecting from the central cross plate portion 92 of a mounting bracket 93. The mounting bracket also has transverse end ears 94 that overlap the inside surfaces of frame side panels 52. The end ears 94 are securely attached to the side panels by hardware members. The cross pin 90 also extends through vertically elongate slots 94A formed in the lower portions of lift plates 84 to allow travel of cross pin 90 along the slots 94A as the linear actuator 87 is extended or retracted to raise and lower the conveyor center platform section 76C.

The center platform section 76C is maintained in generally horizontal orientation as the platform section is raised and lowered by the assistance of restraining arms 95, each having one end portion attached to a cross rod 96 that spans between the frame side panels 52. The opposite ends of the restraining arms 95 are formed with a short transverse end section that is pivotally attached to a cross pin 97 spanning between an upper end portion of lift plates 84. The ends of cross pin 97 extend through close-fitting openings formed in the lift plates 84. The restraining arms 95 are shaped and sized to swing about cross rod 96 as linear actuator 87 is operated to raise and lower the elevation assembly 81. As will be appreciated, the restraining arms cooperate with pivot arms 82B and 82D to jointly allow the platform center section 76 to raise and lower while retaining the platform section in substantially horizontal orientation during such raising and lowering.

The belts 14A and 14B can be of numerous constructions and compositions as is known in the art. Typical belts are composed of rubber, solid synthetic rubber, synthetic rubber molded around a fabric interior, or plastic material, such as a thermal plastic elastomer, or a combination thereof, and are typically of relatively thin, flat construction. However, the belts 14A and 14B can be of other constructions, such as of open mesh or grate design.

Figure 7:
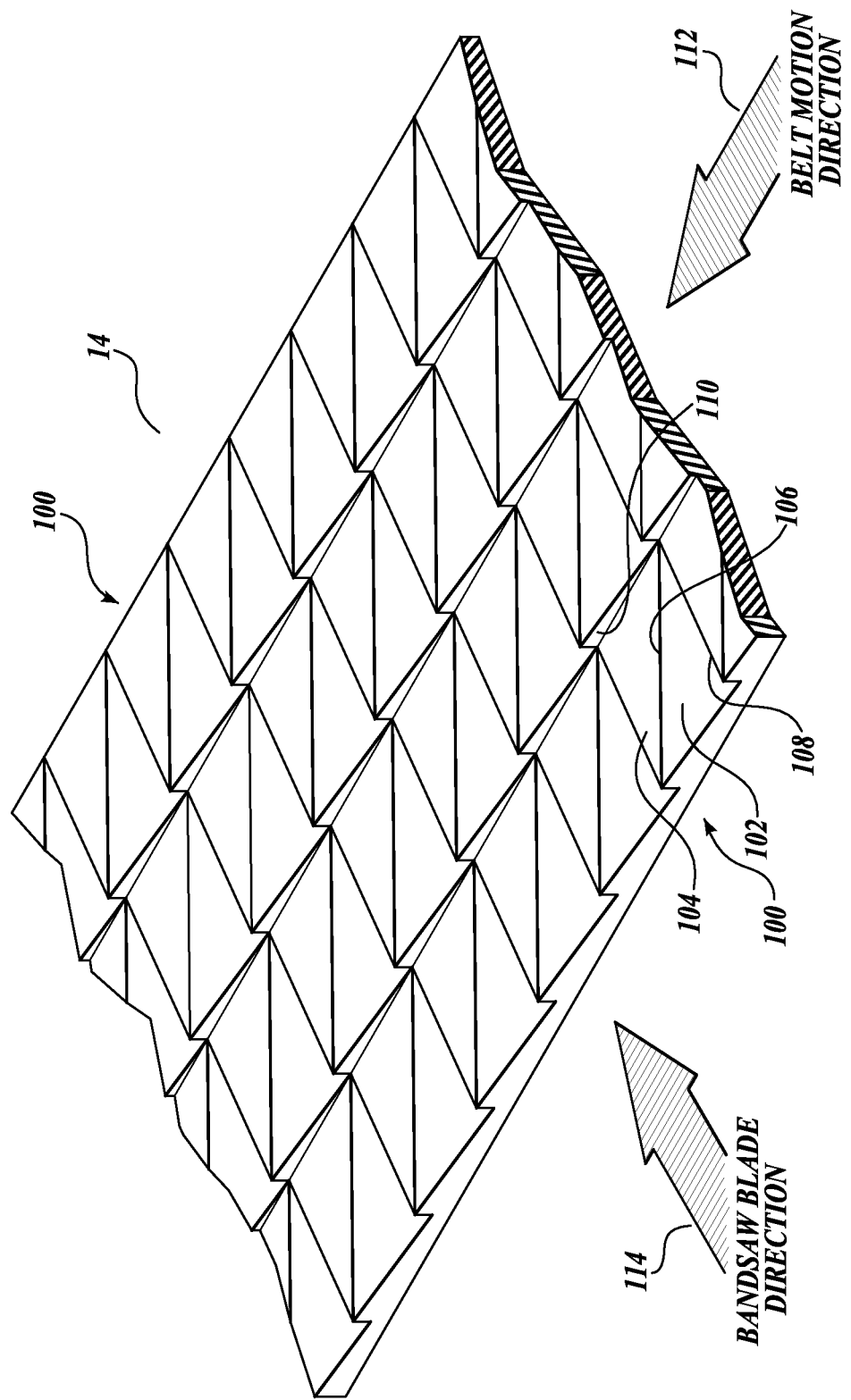
FIG. 7 is an enlarged, fragmentary view of an embodiment of a transport and support conveyor belt.

FIG. 7 illustrates an embodiment of the present disclosure wherein the belts 14A and 14B are of "flat" composition, but with the top surface of specific contour or design. As shown in FIG. 7, the belt is composed of longitudinally arranged and laterally arranged sequential sections or "squares" 100. Each "square" 100 is composed of a first generally triangular section 102 and a corresponding, complementary triangular section 104. The two sections 102 and 104 intersect at a diagonal ridge line 106, with one end of the ridge line forming the highest elevation of each square. The triangular section 102 slopes upwardly in the longitudinally forward direction of the belt, but also slopes downwardly to the left side of the belt, as viewed in the belt's direction of movement, as shown in FIG. 7, thereby defining an abutment edge 108 along the rear portion of each square formed by the next rearward square. The triangular section 104 of each square slopes downwardly in the forward and also in the right-hand direction shown in FIG. 7, thereby defining a side abutment 110 with the square located just to the right of the square in question. As can be appreciated, the rearward abutment 108 can assist in resisting rearward sliding of a workpiece 16 as the lower conveyor belt 14 moves forwardly in the direction of arrow 112 noted in FIG. 7. In addition, the side abutment 110 helps resist sideways movement of a workpiece 16 when being cut by a band saw blade or other cutting device moving in the direction of arrow 114 shown in FIG. 7. It will be appreciated that the rearward abutment 108 is of maximum height on the left-hand edge of a square shown in FIG. 7, whereas the side abutment 110 is of maximum height in the forward edge direction of a square.

The foregoing described construction of the upper surface of belt 14 can be easily incorporated into the belt during the process of moulding or otherwise fabricating the belt. This construction enables the belt to retain its flexibility and durability since the belt is composed of a singular, unitary structure.

Referring primarily to FIGS. 2, 3, 4, 5 and 6, the hold-down conveyor 24 is also constructed in two side-by-side lanes composed of a right conveyor belt 26A and a left conveyor belt 26B that overlie lower conveyor belts 14A and 14B. As shown in FIG. 2, vented covers 120 and 122 are pivotably mounted on frame 41 to cover the inlet side of the apparatus (upstream of slicing station 20), including belts 14A and 14B, and the outlet section of the apparatus (downstream of slicing station 20), respectively. These covers have been removed from the depiction of the present embodiment shown in FIG. 3 so as to enable the structure beneath the covers to be more clearly visible.

Figure 5:
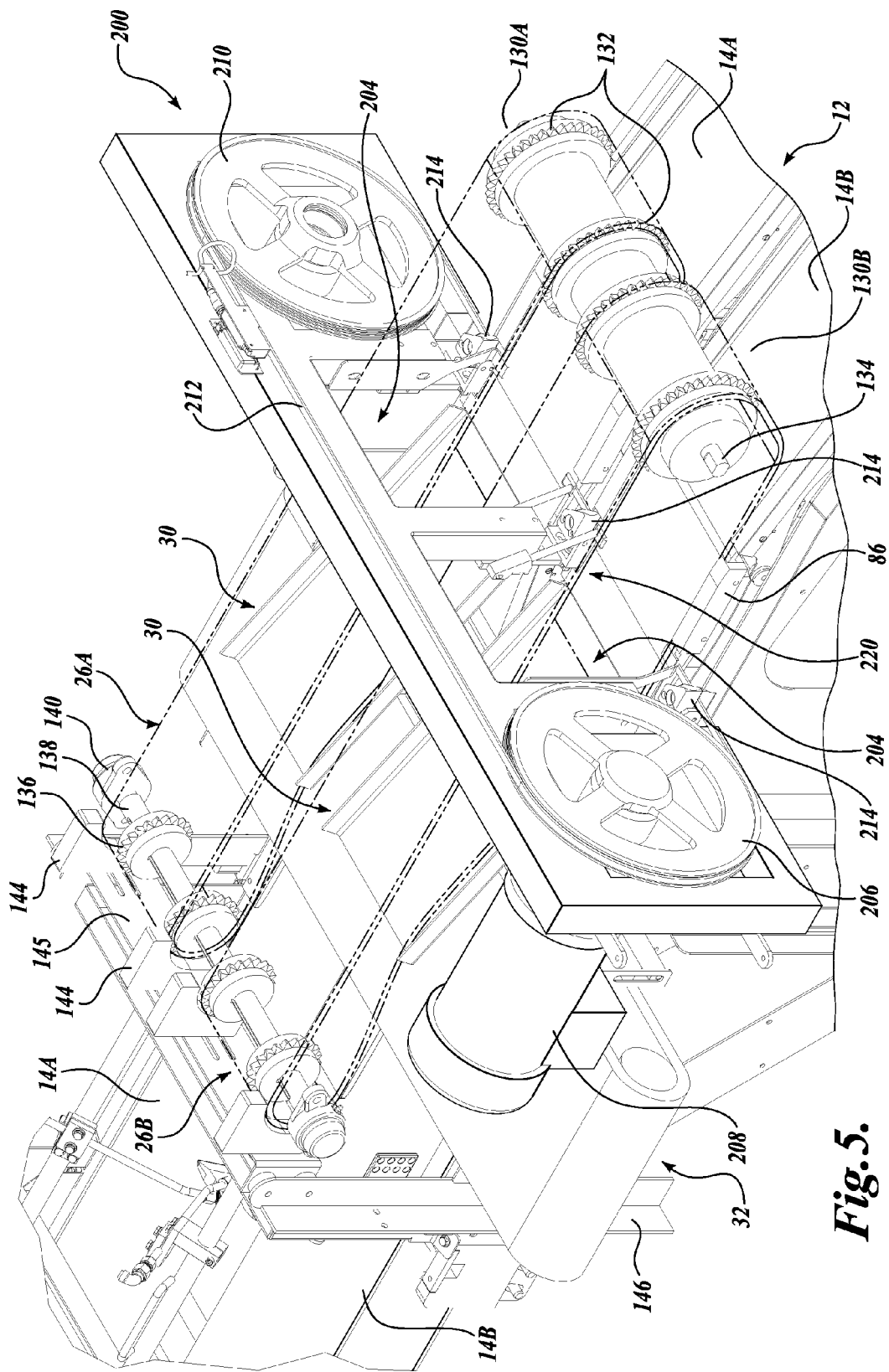
FIG. 5 is an enlarged fragmentary, isometric view of the slicing station and hold-down conveyor sections of FIGS. 2 and 3 with portions removed.
Figure 6:
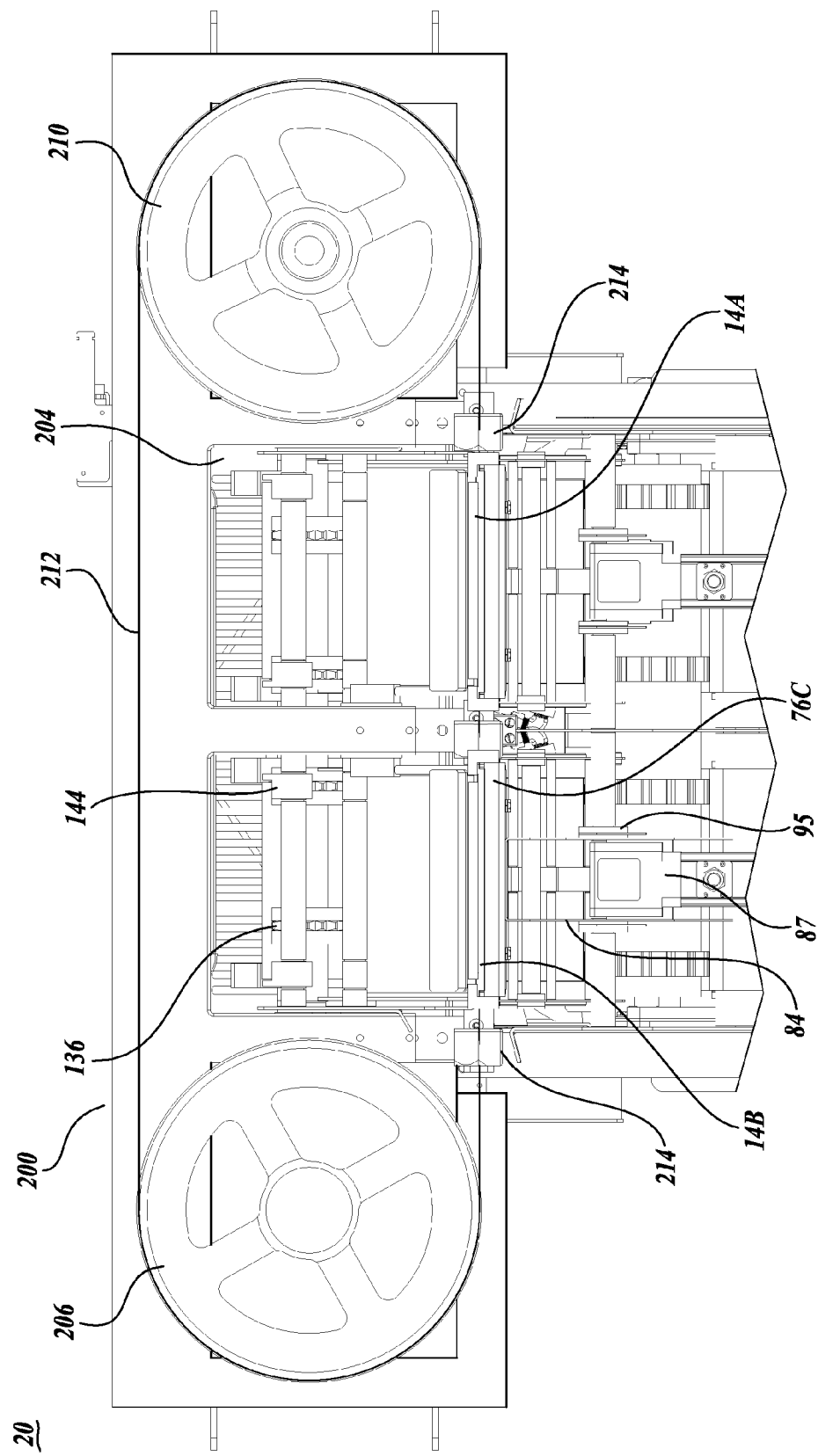
FIG. 6 is a view taken transversely to the length of the system shown in FIGS. 1 and 3, thereby facing the slicing station.

Drive roller assemblies 130A and 130B are employed to power belts 26A and 26B, see especially FIG. 5. Each drive roller assembly 130 includes a pair of drive sprockets 132 that engage with a drive chain incorporated into the side edge portions of the belts 26A and 26B. A drive motor, not shown, is incorporated into the interiors of the drive roller assemblies 130A and 130B for rotating the drive roller assemblies and thereby powering the hold-down belts 26A and 26B. The drive roller assemblies 130A and 130B are supported by a central support shaft 134, with the end portions thereof carried by side plates 135 of the conveyor structure. As shown in FIG. 3, pairs of shoes 135A are utilized to retain the adjacent end of the conveyor belts 26A and 26B engaged with sprockets 132. The shoes 135A have an accurate edge portion that closely overlies the adjacent portions of belts 26A and 26B. The shoes 135A are mounted on an end plate 135B that spans between the adjacent end of side plates 135.

Referring specifically to FIGS. 3-5, at the opposite end of conveyors 24A and 24B, the conveyor belts 26A and 26B are trained over idler sprockets 136 rotatably mounted on an idler shaft 138, having its end portions supported by bearing members 140 mounted to side plates 135. Pairs of shoes 144 are also utilized at the downstream end of conveyor 24 to restrain the conveyor belts 26A and 26B traveling around the sprockets 136. The shoes 144 have an arcuate edge section that closely overlies the adjacent portion of the belts 26A and 2613. The shoes 144 are mounted upon a cross plate 145, which in turn is supported by the upper end portions of post structures 146 extending upwardly from frame side panels 52.

Figure 9:
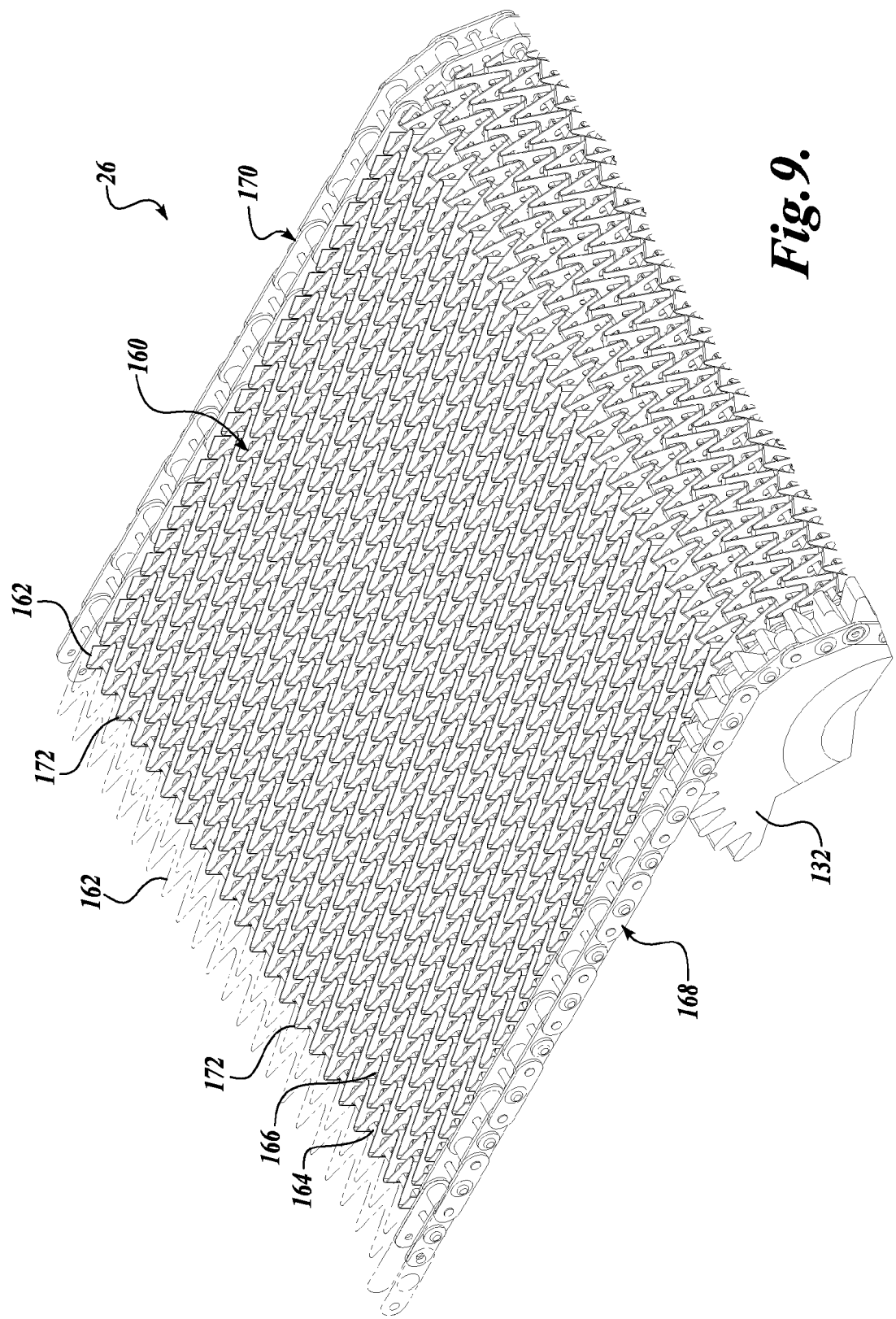
FIG. 9 is an enlarged fragmentary view of an embodiment of the hold-down conveyor belt usable in conjunction with the present disclosure.

One construction of hold-down conveyor belts 26A and 26B according to the present embodiment is illustrated in FIG. 9. Of course, conveyor belts 26A and 26B can be of other constructions. The belt construction illustrated in FIG. 9 is constructed from a plurality of pickets 162 supported by pairs of connecting rods 164 and 166 that span across the conveyor to engage with the links of drive chains 168 and 170 extending along the sides of the conveyor belt. Each of the pickets is formed from a single strand of flat wire repetitively bent to form links 172. The construction of belt 26 is described in U.S. Pat. No. 6,854,590, incorporated herein by reference.

As noted above, conveyor belts of other constructions can be employed with system 36 of the present disclosure. Some such hold-down belts are, for example, illustrated by U.S. Pat. Nos. 5,415,274 and 2,619,306. Preferably, the belt 26 is of compliant construction, allowing the belt to lie over the top surface of workpiece 16 to conform to the topography or curvature of the workpiece, for example, as shown schematically in FIG. 1. Accordingly, the belt 26 is operated in "slackened" condition rather than being taut. This allows the belt to apply a downward load along the entire top surface of the workpiece 16 rather than just at the high points of the workpiece, which would be the case if belt 26 were operated in taut condition. As a result, a substantially uniform downward force is applied over substantially the entire area of the top surface of workpiece 16. If the belt 26 was in taut condition a larger compression force would be applied to the thickest (higher-most) region(s) of the workpiece. This can distort or even damage the workpiece. As can be appreciated, the amount of "slack" needed in belt 26 can depend on the amount of contour of the top surfaces of the workpieces 16. If the workpieces have significant contour, then the amount of slack needed to enable the belt to overlie the top surfaces of the workpieces may be more than if the top surfaces have only moderate or slight variation in contour.

Also, by its "open mesh" construction the lower edges of the hold-down conveyor belt is capable of engaging the workpiece 16 to urge it forward as the workpiece is being cut at the slicing station, and then causing the upper trim part 28 to slide up the trim tray 30 and onto the take-away conveyor 32, as discussed below.

It will be appreciated that conveyor belt 26 need not necessarily be of "open mesh" construction, but could be of "closed" construction, perhaps with a textured lower surface and of sufficient flexibility to conform to the topography of the upper surface of workpieces 16. The texturing of the lower surface of such a closed construction belt could be sufficient to "grip" the upper surface of the workpiece, especially when conveying the workpiece up the sloped trim tray 30, as shown in FIG. 1.

As noted above, the second workstation 20 is in the form of a slicing station. This station includes a housing frame 200 that extends transversely relative to the length of conveyor 24. The housing frame 200 is mounted to side panels 52 by brackets 202 that overlap the exterior surface of the side panels. Openings 204 are formed side-by-side in the central portion of the housing frame 200 to allow passage there-through of compliant belts 26A and 26B. The housing frame 200 is configured to support a band saw assembly composed of a pulley 206 powered by a motor 208 and a second idler pulley 210 mounted on the opposite end portion of housing frame 200. An endless band saw blade 212 is trained over pulleys 206 and 210. The lower run of the band saw blade 212 is guided by three sets of shoes 214, one each located laterally outwardly of openings 204, and a third central shoe located between the openings 204. The shoes 214 include a horizontal slot to closely receive the band saw blade 212 therebetween to restrain and guide the band saw blade during its horizontal travel below the upper hold-down conveyor 24 and above the lower support and transport conveyor 12. Doors 216 provide access to pulleys 206 and 210 as needed, but enclose the pulleys during operation of the slicing station.

Figure 8:
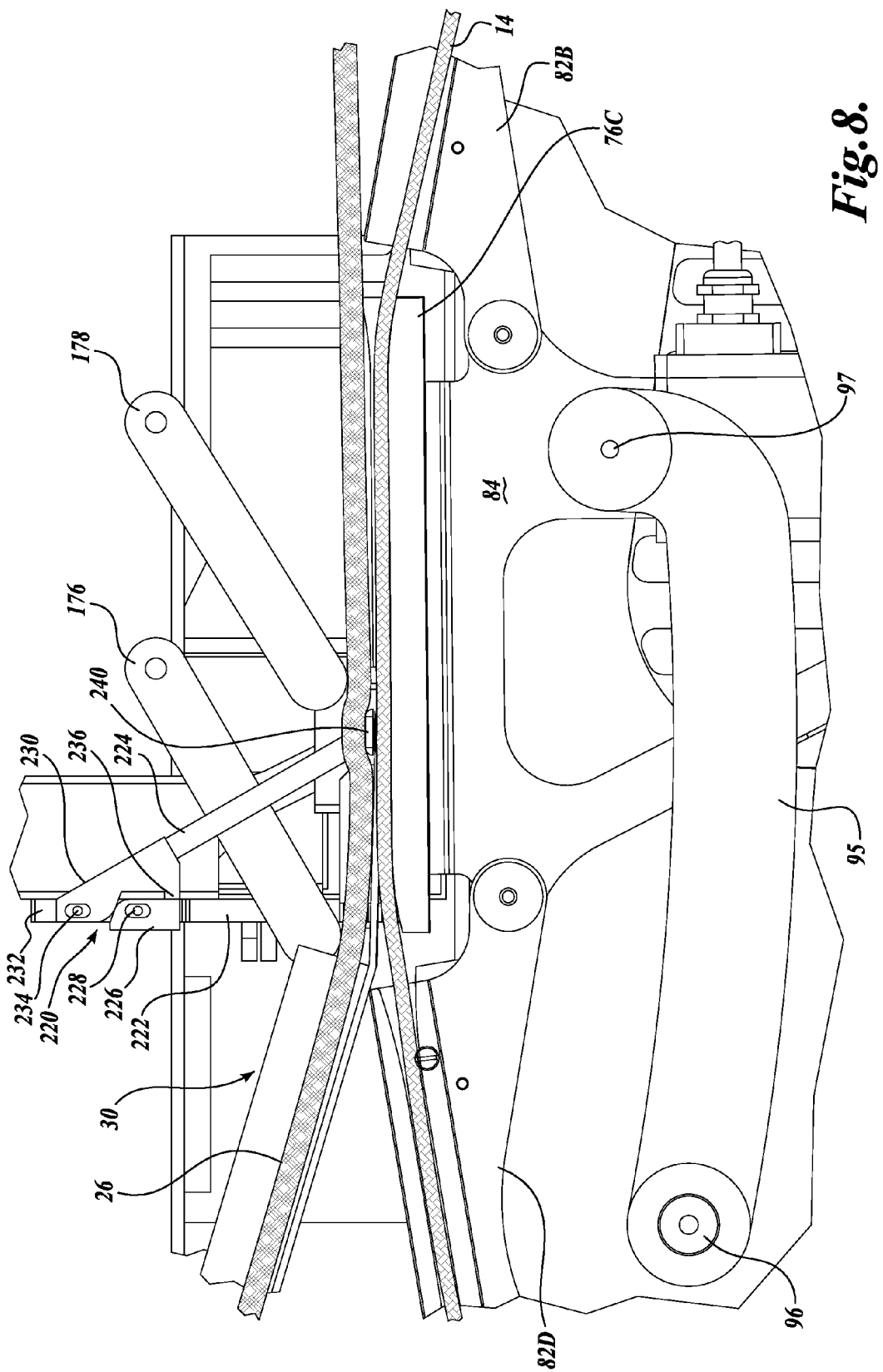
FIG. 8 is an enlarged fragmentary elevational view of a portion of the system shown in FIGS. 2 and 3 illustrating the interaction between the transport and support conveyor, the hold-down conveyor, and the slicing station.

Because the lower runs of the hold-clown conveyor belts 26A and 26B are in substantially slack condition, so as to conform to the topography of the upper surface of workpieces 16, it is desirable to support the lower runs of the hold-down conveyor belts slightly above the elevation of band saw blade 212 as the hand saw blade passes beneath the hold-down conveyor belts. Referring specifically to FIGS. 5 and 8, this is accomplished through a support system 220 located alongside the lower runs of the conveyor belts 26A and 26B and just above the band saw blade 212. The support system 220 is constructed so it can pivot out of the way for cleaning and inspection. The support system 220 includes an upright support post 222, the upper end of which pivotally supports a diagonal support arm 224. A socket 226 is attached to the upper end of post 222. A second socket 230 is attached to the upper end portion of support arm 224 and is pinned to a connection link 232 extending upwardly from socket 226. The connection link is receivable within a close-fitting slot formed in the upper portion of socket 230. The connection link is also receivable within a close-fitting slot formed centrally in the lower socket 226. A cross pin 228 extends through a close-fitting hole formed in the connection link to extend outwardly through vertically elongate slots formed in socket 226, thereby to allow the link to raise and lower relative to the socket. A cross pin 234 also extends to a close fitting upper hole formed in the link 232 to extend through vertical slots formed in the second socket 230 which allows the second socket to raise relative to link 232.

Also, the second socket is configured with a lower abutment portion 236 that bears against the side of the first socket 226 to limit the downward pivot of the lower end portion of the support arm 224, but also allows the arm 224 to pivot upwardly, for instance when desiring to lift the belt 26, for example during inspection or cleaning of the slicing station 20. A snubber or nose portion 240 is attached to the lower end of support arm 224 to extend laterally therefrom towards the longitudinal center of corresponding belts 26A or 26B. The nose portion supports the drive chains 168 and 170 of the hold-down belts. In this regard, the underside of the drive chains 168 and 170 ride over the upper surface of the nose sections 240

It will be appreciated that other methods of supporting the lower run of the hold-down belts 26A and 26B can be utilized. For example, a stationary support structure can be positioned above or just before and just after the band saw blade 212 to allow the belts 26A and 26B to ride thereover and not interfere with band saw blade 212. If the weight of the hold-down belts 26A and 26B is not sufficient, a downward load can be imposed thereon, especially in the sections of the belts located adjacent the slicer station 20. As shown in FIGS. 1, 4B and 8, the downward load can be applied to the lower run of the conveyor belts 26A and 26B by pivot plates 176 and 178 that are pivotably supported at their upper ends to the side plates 135 of the conveyors 24A and 24B, to extend downwardly and forwardly (downstream relative to the moving direction of belts 26A and 26B) to nominally ride over the upper surfaces of the belt lower run. The pivot plates 176 and 178 may be of adequate weight to add a sufficient downward load on the belts 26A and 26B. Alternatively, the plates 176 and 178 may be spring-loaded to bias the plates in the downward direction. The pivot plates 176 and 178 may extend substantially across the entire width of the belts 26A and 26B or partially across the widths of the belts.

Of course, numerous other methods could be utilized to apply additional downward load on the hold-down belt 26. For example, a transverse roller (not shown) can be supported by a shaft to roll over the upper surface of the belt, with the ends of the shafts engaged with vertically elongate slots formed in upright support posts. In this construction, the roller not only can bear downwardly against the upper surface of the lower run of the conveyor belt 26, but also retract upwardly as a workpiece 16 passes beneath the roller.

As another alternative, a chain or similar item can be extended across the upper surface of the belt 26, thereby to apply a downward load on the belt.

It will be appreciated that the optimum load imposed on the workpiece 16 will depend on various factors, including the type of workpiece, and if the workpiece is composed of food, the type of food. For example, the optimum load for slicing chicken breasts likely would be different than if the disclosed systems 10 and 36 are used to slice frozen fish or frozen or non-frozen beef. By way of example, if an open mesh belt configuration is used for the hold-down conveyor belt, and if the present system is used to slice raw chicken breasts, then the load on the chicken breast by the conveyor belt could be in the range of 0.05 to 0.2 psi, and the preferred range of about 0.06 to 0.1 psi.

Figure 11A:
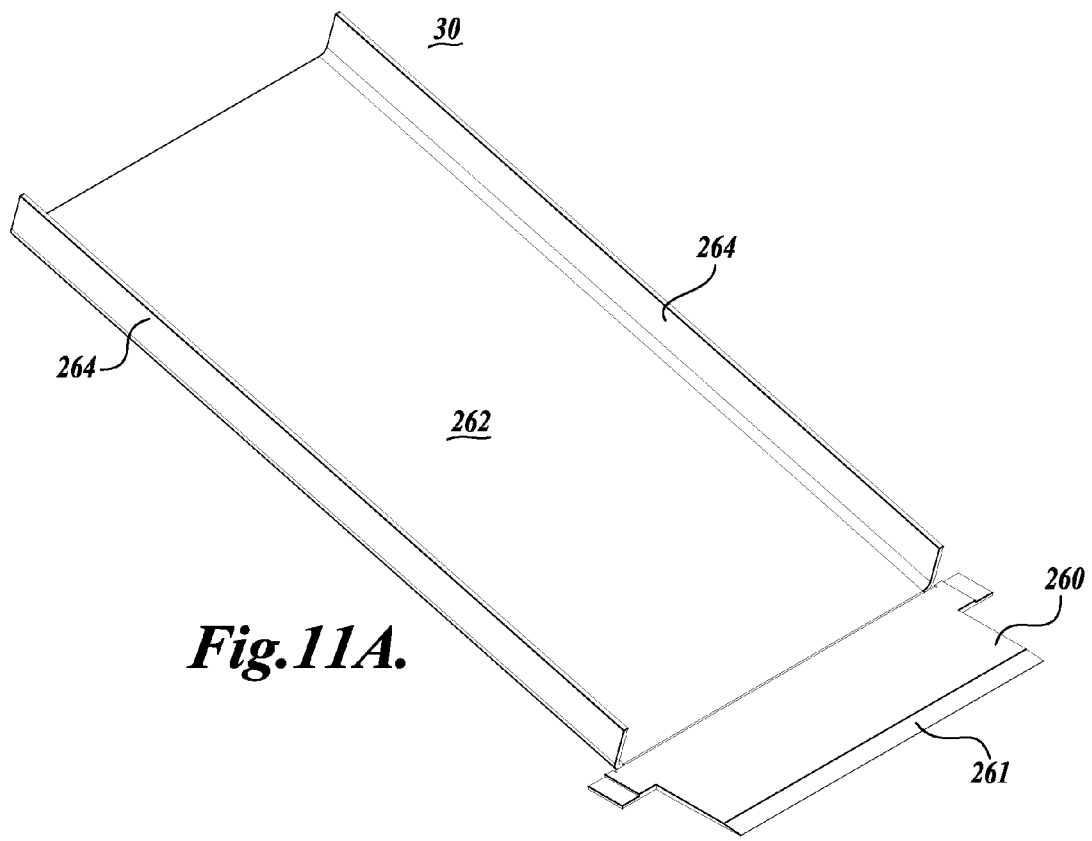
FIGS. 11A and 11B are isometric views of the upper side and lower side, respectively, of a trim tray utilized in conjunction with the systems disclosed in FIGS. 1-3.
Figure 11B:
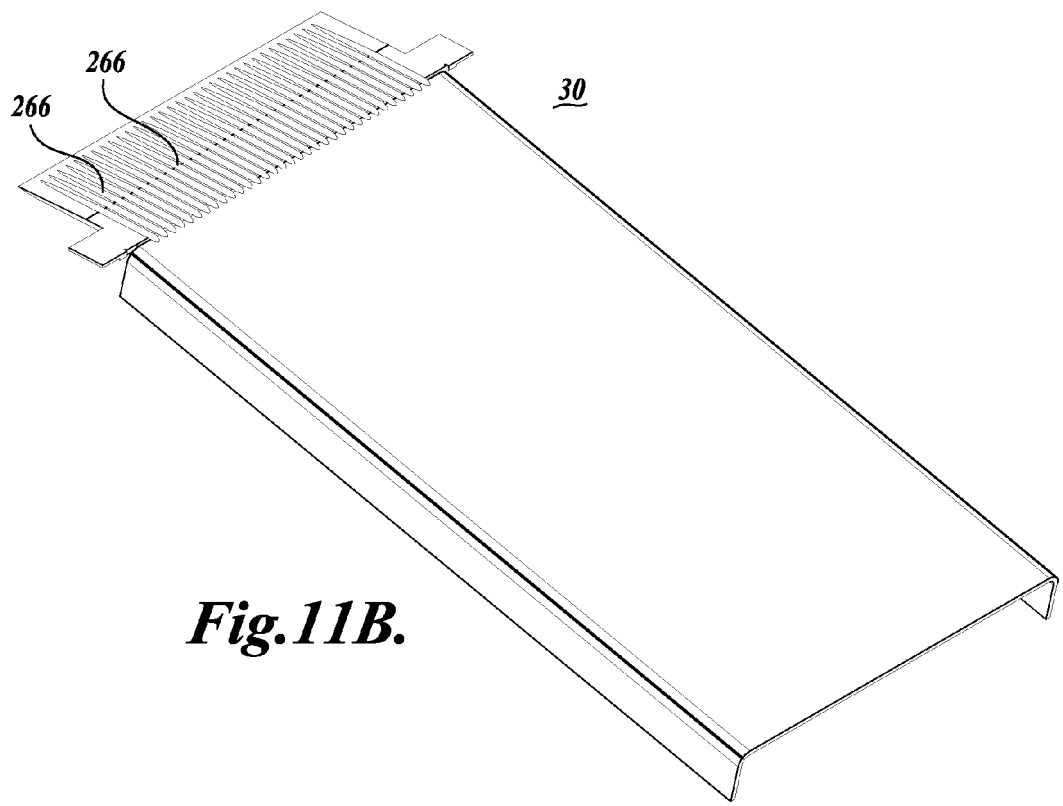

Referring specifically to FIGS. 1, 4B, 5, 8, 11A, and 11B, a trim tray 30 is employed to automatically remove the upper trim portion 28 of workpiece 16 after being cut at the slicing station 20 and direct such upper trim portion to a take-away conveyor 32. In construction the trim tray 30 includes a forward leading edge portion 260 which is positioned immediately behind (downstream) band saw blade 212. The upper side of the leading portion of the leading edge 260 is tapered 261 in the direction of the band saw blade 212 so as to provide a substantially continuous surface to the underside of the upper trim portion 28 as the upper trim portion leaves the band saw blade in the downstream direction. As shown in FIGS. 5 and 8, the leading edge portion 260 of tray 30 is substantially horizontal, and then the tray bottom surface 262 slopes upwardly in a downstream direction. Short sidewalls 264 extend alongside the side edges of the tray 30 to retain the upper trim portions 28. These sidewalls 264 attach to the insides of conveyor side plates 135 thereby to support the trim tray in position. As shown in FIG. 11B, the lower surface of the tray leading edge portion 260 includes a plurality of longitudinal grooves 266 formed into the surface of the leading edge. The grooves 266 help in guiding the sliced lower portion 22 longitudinally downstream as the workpiece 16 is being cut by the band saw blade 212. As can be appreciated, the workpiece 16 may tend to move laterally of the lower conveyor belt 14 under the cutting influence of the band saw blade. The grooves 266 provide resistance to the sideways movement of the sliced lower portion 22. Other means can be provided in place of the grooves 266. For instance, ridges can be formed along the leading edge of the lower surface to serve the function of the grooves 266.

The tray extends diagonally upwardly in the downstream direction from the leading edge 260. The distal downstream end portion of the trim tray 30 terminates above a transverse take-away conveyor 32, see FIGS. 1, 2, and 5. The take-away conveyor 32 is supported on frame 41 beneath conveyor 24. The discharge end of the conveyor 32 can be matched with a further conveyor, not shown, to route the upper trim portions 28 to a desired location.

As noted above, in addition to a slicing workstation 20, other types of workstations may be utilized with or integrated into systems 10 and 40. As shown in FIG. 1, one such workstation may consist of a scanning station 18. A scanning station may employ a scanner 300 that scans the workpiece 16 to produce scanning information representative of the workpiece, and then forwards the scanning information to the processor/computer 34.

The processor/computer, using a scanning program, analyzes the scanning data to develop a thickness profile of the scanned workpiece. The processor/computer also develops an area and/or volume distribution of the scanned workpiece. The processor/computer 34 then can model the workpiece to determine how the workpiece might be sliced or otherwise divided into end products of one or more specific physical criteria, including, for example, weight, shape, area, or thickness. The processor/computer in addition may factor in any defects found in the workpiece during the scanning process. The yield of the potential end product can be determined using either the scanning program and/or a separate portioning program associated with cutter, slicers, and/or other portioning equipment. Based on such yield determination, a specific end product configuration can be selected. The processor/computer, using the scanning program or the portioning program, determines how the workpiece may be portioned/sliced into one or more end products of desired configuration. The processor 34, using the portioning software, then controls the slicer 20 to portion or slice the workpiece according to the selected end product configuration.

The scanning system 18 may be of a variety of different types, including a video camera (not shown) to view a workpiece 16 illuminated by one or more light sources. Light from the light source is extended across the moving conveyor belt 26 to define a sharp shadow or light stripe line, with the area forward of the transverse beam being dark. When no workpiece 16 is being carried by the conveyor belt 26, the shadow line/light stripe forms a straight line across the conveyor belt 26. However, when a workpiece 16 passes across the shadow line/light stripe, the upper, irregular surface of the workpiece produces an irregular shadow line/light stripe as viewed by a video camera angled downwardly on the workpiece and the shadow line/light stripe. The video camera detects the displacement of the shadow line/light stripe from the position it would occupy if no workpiece were present on the conveyor belt 26. This displacement represents the thickness of the workpiece along the shadow line/light stripe. The length of the workpiece is determined by the distance of the belt travel that shadow line/light stripes are created by the workpiece. In this regard, an encoder (not shown) is integrated into the conveyor 12, with the encoder generating pulses at fixed distance intervals corresponding to the forward movement of the conveyor.

In lieu of a video camera, the scanning station may instead utilize an x-ray apparatus (not shown) for determining the physical characteristics of the workpiece, including its shape, mass, and weight. X-rays may be passed through the object in the direction of an x-ray detector (not shown). Such x-rays are attenuated by the workpiece in proportion to the mass thereof. The x-ray detector is capable of measuring the intensity of the x-rays received thereby, after passing through the workpiece. This information is utilized to determine the overall shape and size of the workpiece 16, as well as the mass thereof. An example of such an x-ray scanning device is disclosed in U.S. Pat. No. 5,585,603, incorporated by reference herein. The foregoing scanning systems are known in the art and, thus, are not novel per se. However, the use of these scanning systems in conjunction with the other aspects of the described embodiments is believed to be new.

The data and information measured/gathered by the scanning device(s) is transmitted to the processor/computer 34, which records the location of the workpiece 16 on the conveyor 12, as well as the length, width, and thickness of the workpiece about the entire area of the workpiece. With this information, the processor, operating under the scanning system software, can develop an area profile as well as a volume profile of the workpiece. Knowing the density of the workpiece, the processor can also determine the weight of the workpiece or segments thereof.

The scanning information can also be used by the computer to ascertain whether there are any defects in the workpiece. Such defects might include tears, holes, fat, bone, or cartilage. For example, if an x-ray apparatus is utilized, if a hole or tear exists, the x-rays will be attenuated to a lesser extent than if the workpiece was structurally intact. Also, for workpieces composed of raw meat, the density of fat, bones, and cartilage is different from the density of the meat. This density variation results in a difference in the attenuation of the x-rays passing through the workpiece. For example, the density of bone is greater than the density of the meat. Thus, the x-rays passing through the bone will be attenuated to a greater extent than the x-rays passing through the meat. As a consequence, by the scanning process, the existence as well as the position and size of the defects in the workpiece may be ascertained. Examples of the foregoing scanning devices are disclosed in U.S. Pat. No. 6,563,904, incorporated by reference herein.

Although the foregoing description discussed scanning by use of a video camera and light source, as well as by use of x-rays, other three-dimensional scanning techniques may be utilized. For example, such additional techniques may be by ultrasound or moiré fringe methods. In addition, electromagnetic imaging techniques may be employed. Thus, the present invention is not limited to use of video or x-ray methods, but encompasses other three-dimensional scanning technologies.

Referring to FIGS. 2, 3 and 4A, sorting stations 38A-38D are mounted on an underlying frame structure 330 constructed similarly to frame structure 41 described above. In this regard, the frame structure 330 includes rollers 332 as well as stationary feet 334. The frame structure supports the section of conveyor 12 that passes beneath the sorting stations. In this regard, the drive roller 64A of the conveyor 12 is supported at the distal end of the frame structure.

The sorting stations 38A-38D each include air nozzles 340 that depend downwardly from adjustable arms 342, having their upper ends mounted to connection brackets 344 that secure the arms to longitudinal support tubes 346. Pressurized air is supplied to the upper end portions of the arms 342 to direct air to nozzle 340. This air is used to laterally eject the sliced lower portions 22 that are traveling along the lower conveyor belts 14A and 14B. Such lower portions may be ejected into a bin, take-away conveyor, or other receptacle or transport means.

in lieu of the air-operated sorting stations 38A-38D, paddles, rotating arms, pick-up arms or other means can be used to remove the sliced lower portions 22 from the belts 14A and 14B.

In use, processing systems 10 and 36 employ a lower conveyor 12 to support and transport workpieces 16 past a cutting device, for example, a band saw used to slice the workpiece into desired thicknesses. Prior to reaching the slicing station 20, conveyor belt 14 may be utilized to transport the workpieces by a scanning station 18 so as to develop a thickness profile of the workpiece, and provide information concerning the weight, thickness, area, and other physical characteristics of the workpiece 16. Such information may also be used to raise or lower the position of belt 12 via elevation assembly 81, thereby to alter the thickness of the sliced lower portion 22.

During the travel of the workpiece 16 along the lower conveyor 12, an upper compliant, hold-down conveyor 24 may be utilized to overlie or otherwise be draped over the workpiece 16. Such compliant hold-down conveyor may include an open mesh belt that is sufficiently slack to overlie and conform to the topography of the upper surface of the workpiece. The hold-down conveyor helps to retain the workpiece in stable stationary position on the underlying conveyor belt 14 while the workpiece is being sliced at slicing station 20. The compliant hold-down conveyor also functions to slide the sliced upper trim portion 28 of the workpiece onto the leading edge of trim tray 30 and then up the inclined trim tray to be deposited onto a transverse take-away conveyor 32.

The same compliant hold-down conveyor 24 may be used to stabilize the workpiece 16 as it approaches scanning station 18, as well as while the workpiece passes under the scanning station. As an alternative, a separate compliant hold-down conveyor can be utilized in conjunction with scanning station 18. Such separate compliant hold-down conveyor may stop short of the scanning station or may continue through the scanning station depending on the type of scanning system that utilized that station 18.

In this manner, workpieces 16 may be scanned and analyzed, then sliced to desired thicknesses in an automated manner without requiring workmen to remove the sliced upper trim portion 28 from the sliced lower trim portion 22. Sometimes the upper trim portion 28 tends to "stick on" or reattach to the lower sliced portion 22 by the adhesion action of proteins present in the workpiece. Also, sometimes workmen have a difficult time determining which of the two sliced portions is the desired portion to retain and which is the "trim" portion. The present embodiments seek to automate this process so as to result in a uniform, reliable end product.

While illustrative embodiments have been illustrated and described, it will be appreciated that various changes can be made therein without departing from the spirit and scope of the invention. For example, other workstations may be utilized in conjunction with those described above. Also, the present invention can be used with various types of food products, including meat products, as well as fruits and vegetables. Moreover, the present invention may be useful in conjunction with non-food products.

In addition, although the systems 10 and 36 utilize one or two conveyor lanes, a larger number of lanes can be employed. In addition, a take-away conveyor, such as conveyor 32, can be utilized for each conveyor lane 12, rather than a single take-away conveyor.

Further, the trim trays 30 can be of other configurations than described above. For example, the trim trays can extend substantially horizontally from the band saw blade, in which case the transport and support conveyors can slope downwardly downstream of the band saw plate. As another example, the trim tray can be composed of a compliant sheet, with only the leading edge and trailing end being fixed. The leading edge could be an inserted highly tensioned member such as music wire that extends across the sheet. The rest of the tray could be composed of, for example, a thin plastic sheet maybe about 15 mils thick Also, other types of slicing/cutting devices can be used in place of the band saw system 20. For example, a horizontal water jet, or a swinging knife blade or a rotating saw blade can be used instead.

The embodiments of the invention in which an exclusive property or privilege is claimed are defined as follows:

1. A compliant hold-down system for a food processing apparatus for slicing a deformable food product to a desired thickness and then separating the sliced sections of the deformable food product from each other, while gripping the top surface of a deformable food product to advance a deformable food product with a compliant hold-down conveyor configured to overlay and grip a deformable food product, the apparatus having a first conveyor for supporting, engaging, and transporting a deformable food product past the workstation, the compliant hold-down system comprising a moving belt structure draped over a deformable food product, wherein:

the belt structure is of flexible material and operable under a low tension load such that the belt structure when draped over a deformable food product nominally conforming to the topography of the surface of a deformable food product facing the moving belt structure while gripping a deformable food product and to enable the distance separating the belt structure from the first conveyor to vary with the changes in topography of the deformable food product facing the moving belt structure; and the belt structure capable of applying a load on a deformable food product in the range of about 0.05 lb. per square inch to 0.2 lb. per square inch of deformable food product.

2. The compliant hold-down system for a food processing apparatus of claim 1, wherein the belt structure comprises an open mesh construction.

3. The compliant hold-down system for a food processing apparatus of claim 1, further comprising a loading subsystem for applying a desired load on the belt structure, said load in turn applyable to a deformable food product by the belt structure.

4. The compliant hold-down system for a food processing apparatus of claim 1 wherein the workstation includes a separator plate positioned downstream of the slicer for supporting a sliced portion of a deformable food product, as said compliant moving belt structure drawing the sliced portion of a deformable food product over the separator plate in the downstream direction.

5. The compliant hold-down system for a food processing apparatus of claim 4, wherein the separator plate extends upwardly in the direction away from the slicer, and said compliant moving belt drawing the sliced deformable food product in the upward direction over the separator plate.

6. A food processing apparatus for cutting a deformable food product at a workstation to a desired thickness and then separating the sections of the cut food product from each other, the apparatus advancing a deformable food product to the workstation with a compliant hold-down conveyor to overlay and grip a deformable food product, the compliant hold-down conveyor operational in a slack condition to enable the hold-down conveyor to nominally conform to the contour of the upper surface of a deformable food product, the compliant hold-down conveyor overlaying and gripping the cut food product to slide the cut food product beyond the workstation along a separating surface for further processing, comprising:
  (a) a workstation for cutting a deformable food product to thickness;
  (b) a first powered support and transport surface for supporting, engaging and transporting a deformable food product to the workstation; and
  (c) a compliant hold-down conveyor cooperating with the support and transport surface to transport a deformable food product to the workstation, said compliant hold-down conveyor comprising a compliant conveyor belt spaced from the support and transport surface and positionable to overlay a deformable food product to grip and apply a load on a deformable food product as a deformable food product is being transported to the workstation, the compliant hold-down conveyor belt constructed of flexible material and operable under a low tension load resulting substantially only from the gravitational mass of the hold-down conveyor belt to nominally conform to the contours of a deformable food product top surface facing the compliant hold-down conveyor belt and to permit the distance separating the compliant hold-down conveyor belt from the support and transport surface to vary with the change in contour of the top surface of the food product, while still gripping a deformable food product during transport of the food product;
  (d) a separator plate positioned above the first support and transport surface extending beyond the cutting workstation; and
  (e) the compliant hold-down conveyor gripping the cut deformable food product to slide the cut deformable food product on the separator plate away from the workstation.

7. The food processing apparatus of claim 6, wherein the workstation comprises a cutting device to cut a deformable food product.

8. The food processing apparatus of claim 7:
  (a) wherein the cutting device is configured to cut a deformable food product into a first section adjacent the compliant hold-down conveyor and a second section adjacent the first support and transport surface; and
  (b) wherein said separator plate located between the first support and transport surface and the compliant hold-down conveyor belt to support a cut first section of a deformable food product for movement along the separator plate in a downstream direction from the cutting device under the influence of the compliant hold-down conveyor.

9. The food processing apparatus according to claim 6, further comprises an analysis station; said analysis station comprises an analysis system to analyze the physical composition of a deformable food product.

10. The food processing apparatus according to claim 9, wherein the analysis system comprises a scanner to analyze one or more physical parameters of a deformable food product selected from the group consisting of the shape, mass, weight, thickness, contour, length, and width of a deformable food product.

11. The food processing apparatus according to claim 6, wherein the first support and transport surface comprises a first conveyor belt for supporting and transporting a deformable food product to and past the workstation.

12. The food processing apparatus according to claim 11, wherein the first conveyor belt is contoured to resist movement of a deformable food product in at least one selected direction along the surface of the first conveyor belt.

13. The food processing apparatus according to claim 11, wherein the first conveyor belt is contoured to define abutments to bear against a deformable food product.

14. The food processing apparatus according to claim 13, wherein the abutments are defined by sloped recesses formed in the first conveyor belt.

15. The food processing apparatus according to claim 11, wherein the first conveyor belt is located below a deformable food product to carry a deformable food product, and the compliant hold-down conveyor belt is located above a deformable food product, wherein the first conveyor belt is configured to be selectively adjustable in position in a direction toward and away from the compliant hold-down conveyor belt.

16. The food processing apparatus according to claim 6:
  (a) wherein the compliant hold-down conveyor belt is located above the first support and transport surface; and
  (b) further comprising a support device to support the compliant hold-down conveyor belt at a minimum elevation relative to the workstation.

17. The food processing apparatus according to claim 6, further comprising a loader for imposing a downward force on the compliant hold-down conveyor belt at a location adjacent the workstation, said downward force in turn applyable to a deformable food product via the compliant hold-down conveyor belt.

18. The food processing apparatus according to claim 6:
  wherein the compliant hold-down conveyor belt comprising an open mesh conveyor belt; and
  further comprising a drive system to drive the open mesh conveyor belt along the first support and transport surface.

19. The food processing apparatus according to claim 6:
  (a) further comprising a second support and transport surface extending alongside the first support and transport surface;
  (b) said workstation positioned along the second support and transport surface; and
  (c) further comprising a second compliant hold-down conveyor belt overlying the second support and transport surface, said second hold-down conveyor belt being flexible in the direction along the direction of travel of the second hold-down conveyor belt.

20. A slicing apparatus for slicing raw meat product to a desired thickness and separating the sliced sections of raw meat product from each other, while gripping the top surface of a raw meat product to advance a raw meat product for slicing with a compliant hold-down conveyor to overlay and grip a raw meat product, comprising:
  (a) a slicer device for slicing a raw meat product;
  (b) a first conveyor for supporting, engaging, and conveying a raw meat product as a raw meat product is being sliced by the slicer device; and
  (c) a compliant hold-down conveyor comprising a compliant conveyor belt spaced from the first conveyor and cooperating with the first conveyor to apply a load on a raw meat product as a raw meat product is being transported past the slicer device, the compliant hold-down conveyor belt constructed with compliant material and operable under a low tension load on said compliant conveyor belt to nominally conform to the contour of the surface of the raw meat product facing the compliant hold-down conveyor belt, said conformance resulting from a downward force generated substantially only by the gravitational mass of the hold-down conveyor belt, while gripping the raw meat product to advance the raw meat product, and to permit the distance separating the compliant hold-down conveyor belt from the first conveyor to vary with the change in the contour of the surface of the raw meat product facing the compliant hold-down conveyor belt;

(d) a separator tray positioned above the first conveyor to extend beyond the slicer device; and (e) the compliant hold-down conveyor gripping the sliced raw meat product to slide the sliced deformable work product on and along the separator tray away from the slicer device.

21. The slicing apparatus according to claim 20, wherein the first conveyor is adjustably positionable in a direction toward and away from the slicer device, thereby to alter the thickness to which a raw meat product may be cut.

22. The slicing apparatus according to claim 20, further comprising a support structure for supporting the compliant hold-down conveyor belt at a desired elevation relative to the elevation of the slicer device to avoid interference between the hold-down conveyor belt and the slicer device.

23. The slicing apparatus according to claim 20, wherein the separator tray extends upwardly in the direction away from the slicer device.

24. The slicing apparatus according to claim 20:

further comprising a second conveyor for supporting a second raw meat product relative to the slicer device, said second conveyor located along the first conveyor;

further comprising a second compliant hold-down conveyor belt cooperating with the second conveyor to apply a load on a second raw meat product as a second raw meat product is being transported past the slicer device; and wherein said second compliant hold-down conveyor belt is constructed of compliant material and operable under a low tension load to enable said second compliant hold-down conveyor belt to nominally conform to the contours of the top surface of a second raw meat product facing the second compliant hold-down conveyor belt and in the direction of travel of said second hold-down conveyor belt.

25. The slicing apparatus according to claim 20, wherein said first conveyor comprises a first conveyor belt for supporting and conveying the raw meat product, said first conveyor belt textured to define abutments to bear against a raw meat product being carried by the first conveyor belt to resist movement of a raw meat product relative to the first conveyor belt in selected directions along the surface of the first conveyor belt.

* * * * *